United States Patent [19]

Hara et al.

[11] 4,178,669

[45] Dec. 18, 1979

[54] METHOD FOR CONTINUOUSLY FIXING A PLURALITY OF TUBULAR FASTENERS ONE BY ONE TO A PLURALITY OF APERTURES PROVIDED IN A SUPPORT PANEL

[75] Inventors: Kunio Hara, Kawasaki; Kohsaku Yoshida, Funabashi, both of Japan

[73] Assignee: Nichi-Ei Bussan Co., Ltd., Tokyo, Japan

[21] Appl. No.: 885,979

[22] Filed: Mar. 13, 1978

Related U.S. Application Data

[62] Division of Ser. No. 738,463, Nov. 3, 1976, Pat. No. 4,131,009.

[30] Foreign Application Priority Data

Nov. 14, 1975 [JP] Japan ................................ 50-136154

[51] Int. Cl.$^2$ ................................................ B23P 17/00

[52] U.S. Cl. ........................................ 29/412; 29/414; 29/417; 29/429; 29/509; 29/525; 29/526 R

[58] Field of Search ................. 29/510, 509, 522, 412, 29/523, 429, 526 R, 413, 417, 816, 243.53, 525, 414, 415; 85/71, 72; 72/391

[56] References Cited

U.S. PATENT DOCUMENTS

| | | | |
|---|---|---|---|
| 2,286,809 | 6/1942 | Hutchison | 29/413 |
| 2,465,144 | 3/1949 | Wyatt | 29/816 |
| 3,048,296 | 8/1962 | Heidenwolf | 29/816 X |
| 3,181,338 | 5/1965 | Zetterlund | 72/391 |
| 3,187,546 | 6/1965 | Simmons | 72/391 |
| 3,232,162 | 2/1966 | Ketchum | 29/816 UX |
| 3,763,541 | 10/1973 | Jaffe | 29/816 X |

FOREIGN PATENT DOCUMENTS

| | | | |
|---|---|---|---|
| 2400287 | 7/1974 | Fed. Rep. of Germany | 29/243.53 |
| 2302442 | 2/1976 | France | 85/71 |

*Primary Examiner*—Charlie T. Moon
*Attorney, Agent, or Firm*—Stevens, Davis, Miller & Mosher

[57] ABSTRACT

A method is disclosed wherein so-called pull-lock type blind fasteners are automatically and efficiently fitted and fixed to a plurality of apertures provided in a panel, or a plurality of aligned apertures provided in superimposed two or more panels to fix them together, with the use of a fastener assembly. The assembly includes a plurality of fasteners connected with one another in a head-to-head connected fashion. The fasteners are fitted by means of a locking tool with a simple construction and a compact size comprising a plurality of piston cylinders telescopically assembled together, which operate in a timed and co-acting relationship with one another by means of cam means to fit the fasteners one by one to the apertures of the panel during the stroke of the pistons in one direction and, during the stroke in the other direction, to fix the fasteners in the apertures and expel and dispose the remnant shaft portions from the formed pull-lock fasteners, simultaneously with receiving the succeeding fastener for the subsequent locking operation.

4 Claims, 16 Drawing Figures

METHOD FOR CONTINUOUSLY FIXING A PLURALITY OF TUBULAR FASTENERS ONE BY ONE TO A PLURALITY OF APERTURES PROVIDED IN A SUPPORT PANEL

This is a division, of application Ser. No. 738,463, filed Nov. 3, 1976, now U.S. Pat. No. 4,131,009.

BACKGROUND OF THE INVENTION

The present invention is related to a method for continuously feeding and fixing a plurality of tubular fasteners one by one to a plurality of apertures provided in a support panel or a plurality of aligned apertures in superimposed two or more panels, with the use of a fastener assembly consisting of a plurality of head-to-head connected tubular fasteners in assembly and also to a method for carrying out said method.

According to the present invention, use is particularly made of so-called pull-lock type, blind fasteners or rivets consisting of a shaft with an upper head and a lower flange and a flanged collar tightly surrounding the lower portion of said shaft on the lower flange of the shaft.

In the locking operation, the collar of said fastener with the associated shaft as a whole is fixted into an aperture provided in a single support panel or aligned apertures of superimposed, two or more panels until the undersurface of the upper flange of the collar securely rests on the peripheral edge of the aperture and then the shaft is forcibly pulled upward through the collar, while said upper flange is kept to securely rest on the peripheral edge of the aperture, so that the collar wall collapses to radially expand between the undersurface of the panel and the lower end flange of the pulled-up shaft. Thus, the aperture of the support panel is securely locked with said tubular fastener. In case of two or more panels, they are securely fixed in an superimposed fashion with the aligned apertures being securely locked with the thus collapsed tubular fastener.

More particularly, the present invention is related to a method for continuously, automatically, and efficiently locking a plurality of apertures provided in one or more panels with the use of a plurality of tubular fastener connected to one another at their upper heads to form an assembly, without damaging the fastener during the locking operation.

Heretofore, locking operation with the use of so-called pull-lock type blind fastener required a very complicated operation including a step of inserting a plurality of fastener into the corresponding apertures of a panel or panels into which they are to be fixed, a stop of securing the undersurface of the flange of the collar of each fastener on the marginal area of the aperture and then pulling-up the head of the shaft to collapse the collar to radially expand and a step of severing the remnant portion of the pulled-up shaft that projects from the upper flange of the collapsed collar.

Therefore, an apparatus having a simple structure and a compact size for carrying out the above-mentioned fastener locking operation has not yet been realized owing to the above-mentioned complicated operation.

Furthermore, thickness of support panel and dimension and diameter of fastener used largely vary depending on the desired locking operation, so that it gave rise to a great difficulty to provide a method and apparatus capable of suitably adjusting thereto to achieve the aimed purposes.

The present invention is therefore to provide an efficient method with less working steps by overcoming the above-mentioned prior technical difficulties as well as an apparatus for carrying out said method, yet with a simple construction and a compact size. Therefore, the main objective of the present invention is to provide a working tool with a very simple construction and a compact size so that it may be used even as a portable type tool, giving rise to appreciable industrial merits.

TECHNICAL DESCRIPTION OF THE INVENTION

Figure 1:
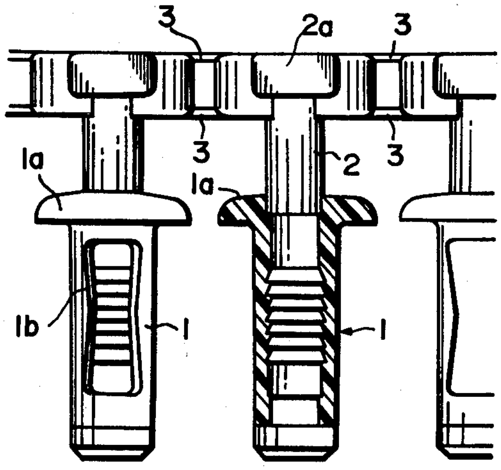
FIGS. 1 and 2 are elevation and plan views, respectively, of one of the embodiments of the connected and aligned fastener assembly used according to the present invention.
Figure 2:
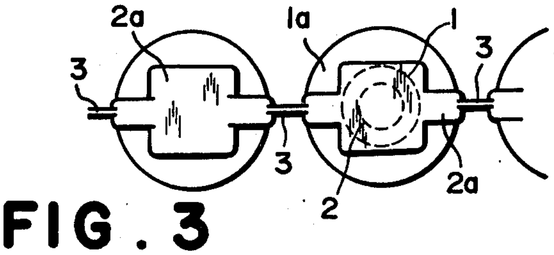

Now the present invention will be described in details referring to the attached drawings:

The tubular fastener used according to the present invention are not specially limited to the type shown in FIGS. 1 and 2, though it is a preferable one. This type of tubular fastener 1 includes a shaft 2 with an upper head *2a* that is used as a connecting portion with the other fastener as well as a gripping portion with which said shaft is pulled upward relative to the collar to expand itself in the locking operation and, at the same time, serves as an aligning means of fastener in its loading groove of the present locking apparatus.

The connecting portions of adjacent fastener each are connected with an upper strap and a lower strap 3 extending in parallel to each other between the adjacent heads *2a*.

Figure 3:
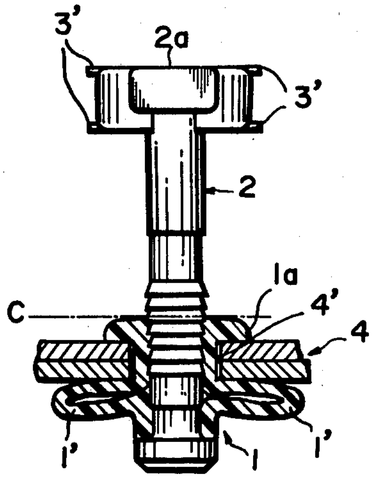
FIG. 3 is a partially sectional elevation of the present tubular fastener that has been locked to aligned apertures of superimposed two panels.

FIG. 3 shows a tubular fastener that has been locked onto aligned apertures 4 of superimposed pair of panels after the shaft 2 has been pulled up from the surrounding collar. The collar portion of the tubular fastener 1 has two openings or windows 1*b* on the opposing sides along its longitudinal axis so that under the application of contraction force thereto in the longitudinal direction and between the undersurface of the panel and the lower flange of the shaft, it may be easily collapsed to form radially expanded portion 1' around the lower portion of the shaft so as to securely fix the superimposed panels between the undersurface of the upper flange 1*a* of the collar and the uppersurface of thus collapsed collar. The shaft 2 has a plurality of shoulders in its lower sidewall along its longitudinal length, so as to prevent the pulled-up shaft from loosening in and sliding back from the central opening of the collapsed collar.

In FIG. 3, the head 2*a* of the shaft has the remnants of connection straps 3' but it should be understood that after locking, the pulled-up shaft 2 will be severed and removed on the plane including the upper-surface of the flange 1a shown at the broken line C with the use of blades or cutting pieces that will be describle later in details.

Figure 4:
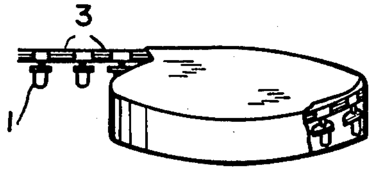
FIG. 4 is a perspective view showing a magazine in which the present fastener assembly is enclosed.

The tubular fastener assembly used according to the present invention is not limited only to the type in which a plurality of fastener are straightly aligned and connected to one another but other type in which they are wound and enclosed in a disk-like magazine as shown in FIG. 4 or any other type wherein they are connected and enclosed in an elongated or cylindrical casing.

Figure 5:
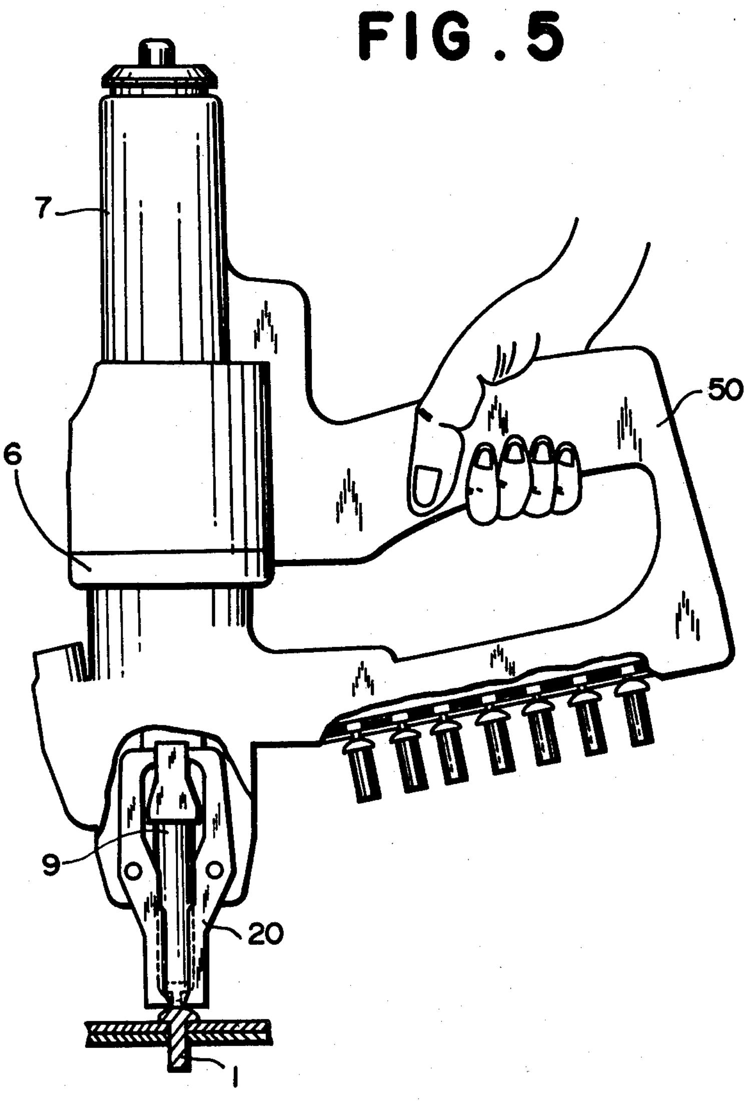
FIG. 5 is a partially sectional elevation of the present apparatus shown in its locking operation.

FIG. 5 shows the locking operation according to the present invention, where aligned apertures of superimposed two panels are being locked with a tubular fastener with the use of the fastener fixing apparatus of the invention.

Now referring to the Figures, the present fastener fixing apparatus indicated as a whole with reference numeral 5 comprises, as essential components, a main cylinder 7 with an upper hollow chamber 7 with a smaller diameter and an integrally formed lower hollow chamber $7_2$ with a greater diameter. An outer piston 8 with a lower piston 81 is concentrically received within said integral two chambers and capable of slidably moving therein in the longitudinal direction. A slide cam 10 is connected to the lower portion of said outer piston via a slide link 12, and a sleeve 14 capable of sliding within the throughbore of said slide cam in the longitudinal direction is rigidly connected to the main body 6 via a connecting rod 143. A main shaft 9 is telescopically received within the throughbores of said slide link 12 and said sleeve 14, respectively, and capable of slidably moving in the longitudinal direction. The main shaft has a piston 91 at the upper end adapted to reciprocate within the throughbore of said outer piston 8, and locking out means 17 and a stop pin 15 associated therewith for effecting either a simultaneous movement of said slide cam and main shaft or an independent movement each thereof in the axial direction, a pair of holding bars 22 are pivotally mounted at the lower end of said slide cam 10, and a pair of cutter pieces 20 are pivotally mounted at the lower end of the main body 6. A pressure air valve assembly P is built in the intermediate thickened wall portion of the main cylinder 7. Further included are handle means 50 extending in perpendicular to the lower portion of the main cylinder 7 and fastener feeding and loading means extending in perpendicular to the lower portion of the main body 6 in substantially parallel relation with said handle means 50.

As the outer piston 8 is threadably secured at the lower end to the slide link 12, while said slide link is in turn threadably secured to the slide cam 10, when the piston 81 of said outer piston 8 moves within the throughbore 71 of the main cylinder 7 in the longitudinal direction, they all move together in the longitudinal direction. The slide link 12 and the slide cam 10 have an integral throughbore in which the piston-like main shaft 9 can vertically move. On the other hand, the sleeve 14 is interposed between the slide cam 10 and the main shaft 9, while it is secured to the main body 6 of the present apparatus via the connecting rod 143. The main shaft 9 has a piston 91 at its upper end, adapted to slide within the throughbore of the cylindrical portion 82 of the outer piston 8, while it has a fastener loading groove 92 at its lower end.

The main shaft has a throughbore through its whole length in which a pushing bar 11 concentrically depends from said upper piston 91.

The said piston 91 is provided with a leaf spring 16 embedded within the upper portion thereof so that it always urges a pushing bar 11 downward through the throughbore of the main shaft 9 until the lower end of the pushing bar slightly projects downwardly into the fastener loading groove 92, thus pressing downwardly the head of the fastener loaded in said groove 92 against the underlying marginal edges of the groove 92 to prevent it moving aside and falling down therefrom.

Figure 10B:
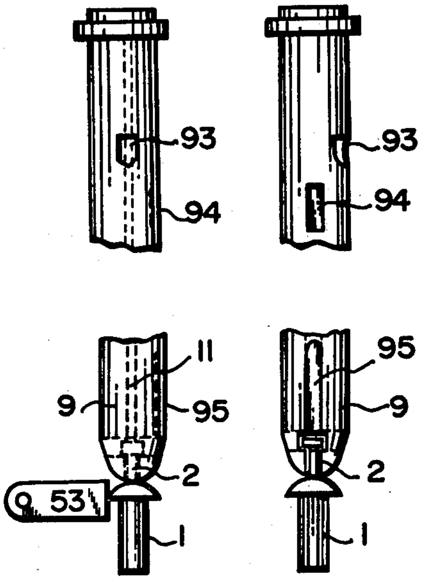
FIG. 10B is an elevation of FIG. 10A.

As shown in FIG. 10B, the main shaft 9 has, on its sidewall, a first upper recess 93, a second lower recess 94 displaced with a 90° radial angle relative to the cross section and a pair of opposing, elongated grooves 95 extending downwardly up the both sides of the lower end fastener loading groove 92, so that any undesired rotation of the main shaft 9 within the slide cam may be avoided as described later and a secure locking engagement between said shaft 9 and the slide cam 10 may be established.

The present invention with the above-mentioned costruction has two pistons, viz., the piston 81 with a greater diameter and the piston 91 with a small diameter. It is therefore self-explanatory that the former creates stronger drive force than the latter.

Figure 6:
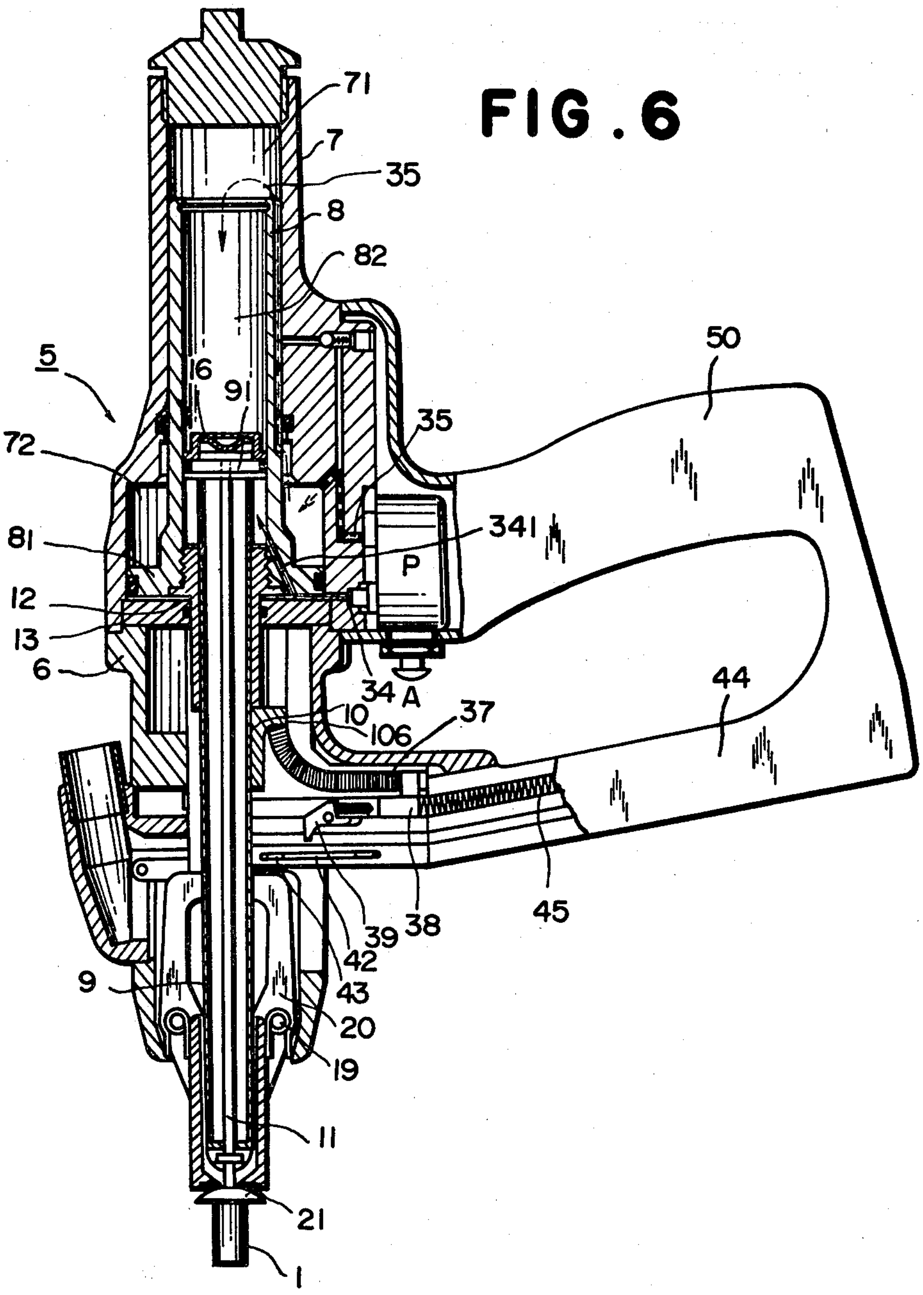
FIG. 6 is a partially sectional elevation of one of the embodiments according to the present apparatus.

As shown in FIG. 6, when the piston 81 has reached its lowest position, a plate ring 13 not only prevents any further downward movement thereof but also serves to seal pressured air introduced into the throughbores 71 and 72 of the main cylinder 7 as well as the chamber of the outer piston 8 from leaking into the hollow body 6 through the slide link 12 and/or the main shaft 9.

Figures 8A, 8B:
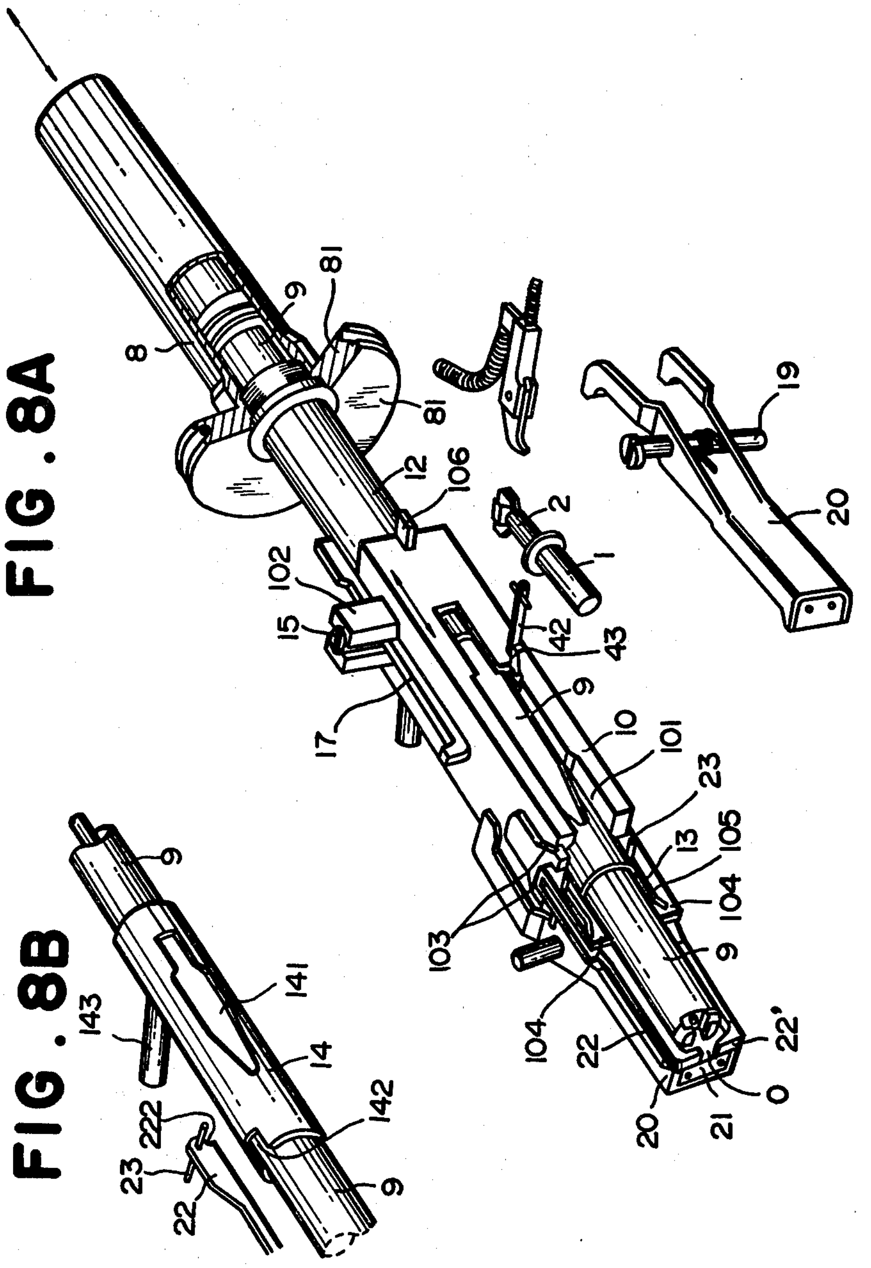

The main shaft 9 extending through the throughbore of the slide link 12 further extends downward through the throughbore of the sleeve 14 that is in turn secured to the main body 6 via the connecting rod 143. The said sleeve 14, as shown in FIG. 8B, has a cylindrical shape with a longitudinally extending bore 141 on the sidewall adapted to receive a fastener from the fastener feeder and another bore diametrically opposite thereto to expel the severed shaft portion therethrough after the locking operation has been effected and also with the opposing cutouts 142 at the lower edge, while it has a connecting rod 143 extending in perpendicular to the longitudinal axis of the sleeve 14 adapted to be secured onto the main body 6. In the inner side of the said connecting rod 143 is provided a pin that is always urged by a spring so that said pin is brought into a locking engagement with one of the above-mentioned recess 94 or groove 95 of the main shaft 9 so as to prevent the undesired rotation thereof within the sleeve 14.

On the other hand, the slide cam 10 capable of sliding on the outer surface of said sleeve 14 has a generally square cross section and elongated cutouts 101 extending upwardly by a substantial distance from the opposing lower edges as shown in FIG. 8A, while a projection 102 enclosing a stop pin 15 is provided on the upper part of one of the other sidewalls where said cutouts 101 are not provided.

At the lower ends of the opposing sides of the slide cam 10 where no cutouts are provided, a pair of opposing protruberances each with a generally trapezoid-shape and laterally inclined cam surfaces 103 are provided, while a pair of bifurcate arms 104 extend from the lower edge portions of said protruberances in a direction parallel to the longitudinal axis of the slide cam 10 for supporting a pair of holding bars 22 therebetween.

The said holding bars 22 are supported by said pair of bifurcated arms 104 in such a manner that said arms each have downwardly extending and then outwardly deflecting, facing guide slots 105 which receive a support pin securely provided at the upper end portion of each of the holding bars 22, allowing free movement of the pin therein.

From one of the sidewalls of said slide cam 10 that faces the fastener feeding means 44 and at the upper end portion thereof, a lug 106 projects which works to abut at one end of a bent coil spring 37 for actuating the fastener feeding means 44 that will be described later in details. The above-mentioned cutouts 101 and 101 provided in the lower portion of the slide cam 10 are arranged in an aligned relation with the opposing windows 142 of the sleeve 14, so that the fastener can be fed, in one direction, from the fastener feeding means 44 to the fastener loading groove 92 of the main shaft 9 through the thus aligned cutouts 101 and windows 140 and, after the locking operation, the severed shaft portion of the fixed fastener can be easily expelled in the other direction. The pair of holding bars 22 each pivotally and slidably supported via the pin 23 within the facing deflecting slots of the bifurcated support arm 104 form their lower ends as inwardly projecting shoes 22', while the upper ends each are shaped round with a right angle cutout 222 facing toward the adjacent sleeve 14 (FIG. 8B). On the side adjacent the lower end of the main body 6, the upper portion of the holding bars 22 are always pressed toward the sleeve 14 via coil spring means 19 (see FIG. 7).

When the outer piston 8 has reached its lowest position within the throughbore of the main cylinder 7, the slide cam 10, as it connects with the outer piston via the slide link 12, has moved down on the circumferential surface of the sleeve 14, while the main shaft 9 has also moved down up to the position shown in FIG. 6.

At this moment, as the holding bars 22 are pivotally held via the pin 23 at the upper portion of the guide slots 105 of the slide cam 10, while the cutouts 222 of the upper portions of the holding bars 22 are brought into a locking engagement with the lower cutouts 142 of the sleeve 14. In this state, the pins 23 held within the guide slots 105 are kept in a riding engagement with the shoulder provided on the inner wall of the main body 6 that surrounds the slide cam 10, so that the holding bars 22 are kept in stationary state, securely holding the head 1*a* of the loaded fastener in the fastener loading groove 92 due to the pair of the holding bars 22 being pressed inwardly to each other under the action of the wire springs 19.

In this state, when the outer piston 8 moves upward, the slide cam 10 secured thereto also slidably moves upward on the circumferential surface of the sleeve 14. At this moment, the cutouts 222 of the holding bars 22 are engaged with the lower cutouts 142 of the sleeve 14. Therefore, even when the slide cam 10 moves upward, the holding bars 22 slide in the slots 105 to remain stationary relative to the slide cam as they are secured to the main body 6 via the sleeve 14, so that the slide cam only moves upwardly.

Further upward movement of the slide cam 10 urges the pins 23 sliding into the outwardly deflecting portions of the guide slots 105, thus moving the upper portions of the holding bars apart from each other to release the engagement of the cutouts 222 of the holding bars 22 with the lower cutouts 142 of the sleeve 14. Thus released, the holding bars 22 are moved slightly upward as the slide cam 10 moves further upward, then the lower shoes 22' of the holding bars 22 enter the space complementally formed between the opposing cutter pieces 21.

The lower portion of the main shaft 9 is telescopically mounted in the throughbore of the sleeve 14 that is in turn rigidly connected to the main body 6. The sleeve 14 is also telescopically mounted in the cylindrical throughbore of the slide cam 10. The slide cam 10 and the main shaft 9 are connected with each other via a stop pin 15 that penetrates the sidewall of the slide cam 10 above the upper end of the sleeve 14 and engages the first recess 93 provided on the sidewall of the main shaft 9. The pin 15 is enclosed with a pin housing 102 provided on the upper portion of the sidewall of the slide cam 10. The sidewall has a vertical throughbore extending in parallel to the longitudinal axis of the slide cam 10, in which is slidably received a lock-out bar 17 with a cam surface that will be described later.

Figure 7:
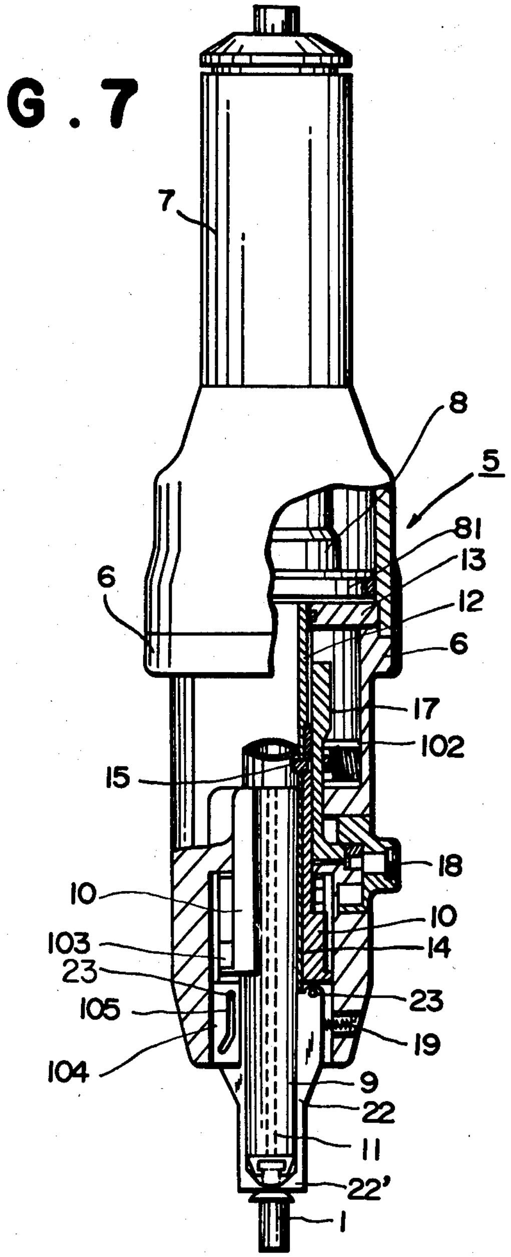
FIG. 7 is a partially sectional, side view of the principal part of the apparatus shown in FIG. 6, FIGS. 8A–B are exploded views showing the details of the constructions of outer piston, slide cam and main shaft, which form the principal part of the present apparatus.

As shown in FIG. 7, the engagement of the slide cam 10 with the main shaft 9 via the stop pin 15 can be easily released by the action of the above-mentioned lock-out bar 17. The stop pin 15 is slidably guided within a horizontal throughbore in the said pin housing which crosses said vertical throughbore 151 and is normally urged inwardly under the action of a coil spring provided in said housing but, when the slide cam 10 and the main shaft 9 in a locking engagement with said stop pin 15 together moves upward in the throughbore of the main body 6, the pin housing also moves up relative to the lock-out bar 17. The lock-out bar 17 is in turn received in the vertical throughbore thereof, because one end of the lock-out bar 17 is securely engaged with the innersurface of the sidewall of the main body 6.

Thus, the stop pin 15 urges inwardly by a coil spring in the pin housing 102 is moved outwardly as the cam surface of the lock-out bar 17 rides on the spring to counteract the spring action so that the locking engagement of the pin with the first recess 93 of the main shaft 9 is released. This in turn releases the connection between the slide cam 10 and the main shaft 9. As mentioned above, when the main shaft 9 and the slide cam 10 together move by some distance upward within the main cylinder 7, the inclined cam surface of the above-mentioned lock-out bar 17 actuates the stop pin 15 to disengage the main shaft 9 from the slide cam 10, so that the main shaft 9 and the slide cam 10 can independently move with the piston 91 and piston 81, respectively.

According to the present invention is further provided a mechanism for desirably adjusting the position of the lock-out bar 17 in relation with the longitudinal axis of the slide cam.

Such adjustment is necessary because in the locking operation, the distance necessary to pull up the shaft from the surrounding collar to sufficiently collapse the collar to radially expand, may largely vary dependent on not only the size of the fastener but also the thickness of the panel or panels to be locked therewith.

The upward movement of the main shaft 9 and the slide cam 10 in a locked state is mainly effected by the action of the larger piston 81, as the piston 81 generates a stronger force than that the smaller piston 91 does.

It should be noted that in the locking state of the fastener shown in FIG. 3 where the collar portion has been collapsed to radially expand on the undersurface of the superimposed panels and where no further pulling up of the shaft is allowable, if the shaft is forcibly pulled up further, it would come out from the collar. It is self-explanatory that when use is made of fasteners having the same size in the present locking operation, the pulling-out distance of the shaft from the collar will be less in case the support panel is thick, whereas the said distance will be greater in case the panel is thin.

Thus, according to the present invention, a rotatable cam gauge 18 with a screw cam surface is provided in the sidewall of the main body 6, which can adjust longitudinal position of the lock-out bar 17 so as to control the longitudinal distance by which the main shaft and the slide cam 10 in the locking engagement are disengaged with each other.

By rotating said gauge 18 until it has been set to the thickness of the panel or panels used, the position of the lock-out bar can be suitably adjusted in the longitudinal direction on the sidewall of the slide cam 10 so that the desired pull-up distance can be obtained.

As shown in FIG. 6, the main body 6 receives the connected fastener through its sidewall, which are fed one after another by means of the fastener feeding means 44 in timed relation to the fastener loading groove 92 provided at the lower end of the main shaft 9. The said fastener feeding means 44 includes a pair of parallel guide grooves for guiding the connected head portions of the fastener assembly perpendicular to the main shaft 9 along a generally straight path, a coil spring 45 for urging the thus guided fastener assembly toward said main shaft 9, a fastener-feeding slider 38 with pawl 38 disposed at the terminal end of said parallel guide grooves, and a fastener feeding stopper 42. The said fastener feeding slider 38 is disposed on the sidewall of the main body 6 with a pawl 39 being pivotally mounted at the forward end as shown in FIG. 6, which is actuated by a bent coil spring 37 and a pressure coil spring 45. The bent coil spring 37 abuts at one end on the undersurface of the stopper 106 of the slide cam 10, whereas the other end extends in a direction perpendicular to the longitudinal axis of the slide cam 10 until it abuts on and is fixed to the innerwall of the main body 6, so that the slider 38 may be normally kept apart from the fastener loading groove 92 of the main shaft 9.

The slider 38 is pressed toward the fastener loading groove 92 within the fastener feeding and loading means 44 but the bent coil spring 37 exerts a stronger counter pressure thereto so as to keep the coil spring 45 in a compressed state.

Figure 9A:
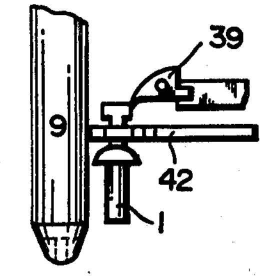
FIG. 9A is a side view showing the manner in which a tubular fastener is fed to the fastener loading groove of the main shaft by means of a fastener slider.

In the loading operation of the fasteners into the loading groove 92 of the main shaft 9, the slide cam 10 first moves up until it reaches the upper dead point. The bent coil spring 37 engaging at one end with the slide cam 10 and pressing the slider at the other end is released from the contraction due to the upward movement of the slide cam 10, so that the coil spring 45 kept in a compressed state is also released to press the slider 38 toward the fastener loading groove 92 of the main shaft 9. The pawl 39 of the slider 38 pushes the underlying head portion of the foremost fastener of the assembly into said fastener loading groove 92 (FIG. 9A).

In this case, if the main shaft 9 is raised with the pawl 39 of the slider 38 pressing the head of the fastener against the sidewall of the main shaft 9, the head will be deformed or damaged otherwise.

Figure 9B:
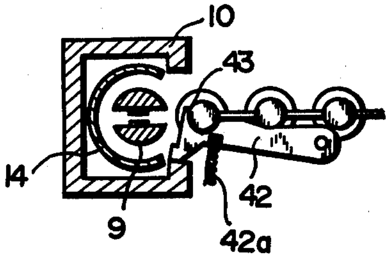
FIG. 9B is a plan view of FIG. 9A.

As shown in FIG. 9B, according to the present invention, the fastener feeding stopper 42 is provided between the main shaft 9 and the slider 38.

Figure 9C:
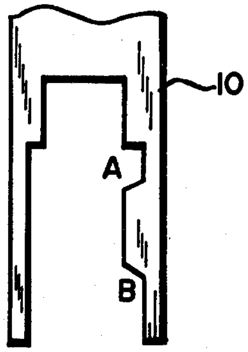
FIG. 9C shows the cam surface provided in a slide cam capable of feeding the fastener in timed relation.

The key-shaped stopper 42 is provided within the fastener feeding means 44 and pivotally supported at its end remote from the main shaft 9, allowing a horizontal swinging movement, while its end close to the main shaft is designed to abut on the cam recess A (FIG. 9C) of the slide cam 10 so that the fasteners may normally be prevented from being fed into the fastener loading groove 92. The stopper 42 for normally withholding the fastener feeding operation is made of a metallic sheet or the like, with an arcuate recess 43 formed in the forward side end thereof for receiving the shaft portion of the fastener therein, while the opposite side of the stopper is held under spring action of a coil spring 42*a*. The fastener held within the arcuate recess 43 of the stopper is prevented from moving into the fastener loading groove 92 of the main shaft 9, so far as the slide cam 10 is kept in contact with the forward end of the stopper 42. When the slide cam 10 moves up from its lower dead point, the forward end of the stopper 42 abutting on the cam recess A of the slide cam 10 enters the lower recess B provided on the innerwall surface of the slide cam 10 (FIG. 9C), so that the stopper 42 is made free. At the same time the engagement of the bent coil spring 37 with the slide cam 10 is released due to the upward movement thereof as previously described, so as to loosen the spring 37 and move the slider 38 toward the fastener loading groove 92 under the spring action of the released coil spring 45. The pawl 39 of the slider 38 pushes the head of the foremost fastener held in the arcuate recess 43 of the stopper into said groove 92, while the connection of the head of the thus loaded fastener with the next fastener will be cut upon the subsequent downward movement of the main shaft 9.

It is obvious to those skilled in the art that the above-mentioned coil spring 45 may be advantageously replaced by a pressured air source, with the same technical effects.

As shown in FIG. 6, the main body 6 has a pair of pinch-type cutter piece arms 20 pivotally mounted via pins 19 at its lower end.

As clearly shown in FIGS. 6 and 7, the cutter pieces 21 are arranged to complement the opposing shoes 22 of the holding ars 22 from the other opposing sides (FIG. 8A), so that a pair of opposing shoes 22 and a pair of opposing cutter pieces 21 arranged in lateral and adjacent relation therewith may form a square-shaped opening O therebetween, through which the collar portion of a fastener may project downwardly.

As the support arms 20 for a pair of cutter pieces 21 are mounted on the lower end of the main body 6 as mentioned above, while the upper ends of said arms 20 project toward the sidewall of the slide cam 10, the projections may abut on the curved side cam surfaces of the raised trapezoid-shaped cam member 103 formed on the opposing sidewalls of the slide cam 10. Upon the upward and downward movement of the slide cam, the support arms 20 for the cutter pieces 21 may swing at the pivot 19 so as to close and open the opposing cutter pieces 21.

Extending downward from the said raised trapezoid-shaped cam member 103 are fixed the previously mentioned support arms 101 for the holding bars 22.

Figure 11:
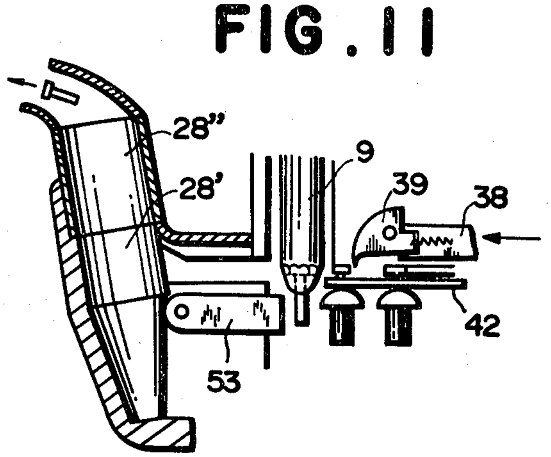
FIG. 11 is a sketch for explaining the manner in which the fastener are fed to their loading groove of main shaft one by one and in which the severed shaft thereof is expelled after the locking operation.
Figure 12:
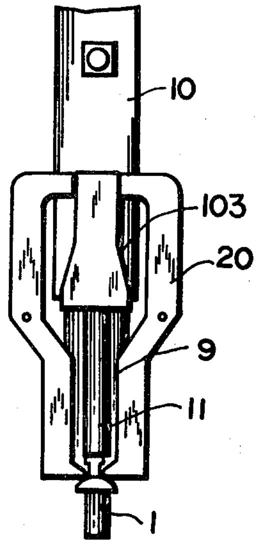
FIG. 12 is an elevation showing the operating relation between cutter pieces and slide cam.

According to the present invention is further provided a fastener shaft expeller block on the side of the main body 6 opposite to the above-mentioned fastener feeding means 44, which is adapted to expel the severed shaft left in the fastener loading groove 92 of the main shaft 9 after the completion of the locking operation involved. The expeller block takes a tubular form as shown in FIG. 11, consisting of an expelling chamber 28′ and an expelling passage 28″ integrally formed therewith. The inlet opening of said expelling chamber 28′ is arranged in a diametrically opposite relation with the outlet opening of the fastener feeding means 44, relative to the main body 6.

Figure 10A:
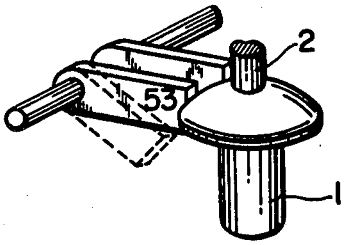
FIG. 10A is a perspective view of a flange stopper adapted to align the loaded fastener in the fastener loading groove.

At the inlet opening of the expelling chamber 28′ may be pivotally arranged a bifurcated flange stopper 53 as shown in FIGS. 10A and 10B, which however may not form any essential part of the present invention.

At the inlet opening is preferably arranged an air passage communicating with air source via an air valve that is actuated when the fastener feeding slider 38 with a fastener moves toward the fastener loading groove of the main shaft 9, so that the expelling chamber may be kept in vacuum, to facilitate the removal of the severed shaft portion therefrom. The outlet of the expelling chamber 28′ may be connected to a suitable flexible pipe or the like, to evacuate the chamber from the severed shafts.

The locking operation according to the present invention will be described in relation with the particular pneumatic drive system that may be preferably used as power source.

First of all, a plurality of fasteners connected with one another at their heads are introduced into the inlet for fasteners which is provided at the rear portion of the fastener feeding means 44 so that the shaft of the foremost fastener may be engageably snapped in the arcuate recess 43 provided in the fastener feeding stopper 42. At this moment, the main shaft 9 of the present apparatus has not yet reached its lowest position. Then, the operator pushes a button A provided on the handle 50 which opens a first air valve 34 to feed pressured air between the piston 81 and the plate ring 13 at the bottom of the outer piston 8 (shown by an arrow line in FIG. 6) thereby to move up the outer piston. The air further enters through a by-passage 341 the space below the piston 91 within the throughbore of the outer piston 8, so that the slide link 12 and the slide cam both rigidly connected to said outer piston 8 and the main shaft 9. (At the beginning of the operation, the fastener loading groove 92 of the main shaft 9 has not yet contained any severed shaft of fastener, so that the main shaft 9 is allowed to move freely up at the same time.

As the slide cam 10 moves up thereby to release the coil spring 37, the fastener feed slider 38 moves toward the main shaft 9 under the action of coil spring 45. Then the pawl 39 provided at the forward end of the slider 38 pushes and securely loads the foremost fastener held in the fastener-receiving arcuate recess 43 of the stopper 42 into the fastener loading groove 92 provided at the lower end of the main shaft 9.

In the fastener loading groove 92, the loaded fastener is held securely under the downward spring action exerted by a pushing bar 11.

Thus, all the other piston 8, the main shaft 9, and the slide cam 10 occupy their uppermost dead points within the main cylinder 7, while the main shaft 9 securely holds a fastener in the fastener loading groove 92 at the lower end thereof.

Then, when the operator releases the button A at the handle 50, a second air valve 35 opens (FIG. 6) to feed pressured air into the outer piston 8 at the chamber above the piston 91 (shown by an arrow line in FIG. 6), thereby to lower said outer piston 8 and, at the same time, the slide link 12 and the slide cam securely connected thereto.

At this moment, the engagement of the slide cam 10 with the main shaft 9 has already been released due to the locking pin 15 being slipped out from the main shaft 9. Thus, as soon as the outer piston 8 moves down by some distance, pressured air is fed into the space of the outer piston above the piston 91 of the main shaft 9 so as to lower it in the throughbore of the outer piston 8, thereby to again establish the engagement of the stop pin 15 with the first recess 93 of the main shaft 9 so that the slide cam 10 and the main shaft 9 can again move together.

At the same time, a spring-urged stop pin concentrically built in the connecting shaft 143 of the sleeve 14 is brought into a locking engagement with the second recess 94 of the main shaft 9, so that the rotation of the main shaft within the throughbore of the sleeve 14 can be prevented.

The reason why the slide cam 10 is firstly moved as mentioned above is to swing the closed cutter pieces 21 to open as the inwardly projecting upper end portions of the support arms 20 for cutter pieces 20 ride on the inclined side cam surfaces of the raised trapezoid-shaped cam members 103 (FIG. 8A) that are formed on the opposing sidewalls of the slide cam 10, so that the collar portion of the loaded fastener may pass downwardly through the thus formed opening between the facing cutter pieces 21.

Thus, the main shaft 9 moves downwardly with the fastener being held at the lower end thereof, while the collar portion of the fastener at the lower end of the main shaft 9 comes down and pushes open the opening O between the opposing, facing cutter pieces 21 as well as the opening between the opposing, facing lower shoes 22′ of the holding bars 22 until the whole collar portion of the loaded projects out from the undersurface of the cutter pieces 21.

At this position, the main shaft 9 occupies its lower deadpoint, with the collar portion of the loaded fastener projecting downward between the cutter pieces 21. On the complementary opposing sides, the lower end shoes 22′ of a pair of the holding bars 22 press downwardly the underlying uppersurface of the upper flange 1a of the fastener, so that all the necessary procedures have now been completed waiting for the subsequent pulling-up step of the shaft of the fastener.

The operator then moves the locking apparatus so as to bring the downwardly projecting collar portion of the fastener to be fitted into the opening provided in a panel and pushes the button A at the handle 50 to open the first air valve 34. Pressured air first passes to the lower portion of the outer piston 8 thereby to move it upwardly.

Within the sidewall of the outer piston 8 is a passage 341 guided to the space in the said piston 8 below the piston, thereby to move the main shaft 9 upwardly. At the same time, the slide cam 10 secured to said outer piston 8 moves up similarly. Thus, inserted in the aperture of the panel, the undersurface of the upper flange 1a of the collar abuts on the marginal area of the aperture 4′ of the panel 4 with the uppersurface of said flange being retained stationary beneath the opening O formed by the opposing cutter pieces 21 and the complementally opposing lower shoes of the holding bars 22. The shaft 9 gripping head portion 2a of the shaft of the fastener with the pinch-like, lower marginal edges of the fastener loading groove 92 is forcibly pulled up from the underlying stationary collar portion, so that said collar portion collapses to radially expand on the undersurface of the panel, to form an optimum pull-locked fastener.

The pull-up stroke of the shaft necessary to adapt to the thickness of the panel or panels used can be desirably adjusted merely by controlling the position in the longitudinal direction of the lock out par 17 which governs the timing of the engagement and disengagement of the slide cam 10 with the main shaft 9 by means of the stop pin 15. This control can be easily made by rotating the rotary cam gauge 18 provided on the sidewall of the main body 6.

Immediately after the shaft portion of the fastener has been pulled up as mentioned above, the locking engagement of the main shaft 9 with the slide cam 10 is released. The outer piston 8 and the slide cam 10 connected thereto further moves up in the main cylinder 7 until the holding bar 22 slidably mounted at the lower end of the slide cam is released from the locking engagement with the sleeve 14, simultaneously with raising the holding bar 22 slightly above the level at which the cutter pieces 21 are positioned. In this state, the main shaft 9 is connected to the support panel via the shaft portion of the fastener that has been locked into the aperture thereof, whereas the air passage provided through the sidewall of and led into the outer piston 8 below the piston 91 is kept open. The air pressure under the piston 91 is so adjusted not to become so high as to break the shaft of the fastener, therefore the piston 91 stops half-way in the throughbore of the outer piston 8 while keeping the shaft in a pulled-up state.

On the other hand, the slide cam 10, upon having been released from the locking engagement with the main shaft 9 as mentioned above, continues to move up further until the trapezoid-shaped cam members 103 on the opposing sidewalls thereof push open the pinch-shaped upper portions of the support arms 20 for the cutter pieces 21 so that the lower end opposing cutter pieces 21 close sidewise the shaft portion of the fastener thereby to sever it at the uppersurface of the upper flange of the collar. The main shaft 9, after the said shaft severing action, moves up in the outer piston 8 under the pressured air force with the severed shaft loaded in its lower end fastener loading groove 92 until it reaches the upper dead end. At this position, the fastener loading groove 92 of the main shaft 9 has reached the level at which, relative to the longitudinal axis of the main body, the fastener feeding slider 38 and the fastener feeding stopper 42 are positioned. Thus, the fastener feeding slider 38 works to feed the next fastener held within the arcuate recess of the stopper 42 to the fastener loading groove 92, while expelling the severed shaft that has been loaded therein to the expelling chamber 28′, when an air valve provided therein is opened to vacuumize that chamber to guide the severed shaft outside through the expelling passage 28″. The above-mentioned operating cycle is repeated further to lock a plurality of apertures in the panel one by one with a plurality of fasteners in an automatical and efficient way.

We claim:

1. A method for continuously feeding and fixing a plurality of so-called pull-lock type tubular fasteners consisting of a shaft with an upper head and a lower flange and a flanged collar tightly surrounding the lower portion of said shaft one by one to a plurality of apertures in a panel or a plurality of aligned apertures in two or more superimposed panels with the use of a plurality of head-to-head connected tubular fasteners in assembly, which is characterized by the steps of continuously feeding each of the fasteners into the fastener loading groove provided at the forward end of a fastener fixing means, press-fitting a tubular collar portion of the thus loaded fastener in the aperture (s) provided in the panel (s) during the forward stroke of said fastener fixing means, locking said aperture with said tubular collar portion by pulling up the shaft portion thereof during the first half of the backward stroke of said fastener fixing means, severing the shaft portion at the plane including the uppersurface of the upper flange portion of the collar, and feeding and loading the succeeding fastener into said fastener loading groove of the fastener fixing means during the second half of the backward stroke, simultaneously with removing the remnant shaft portion of the consumed fastener.

2. A method as claimed in claim 1, wherein the respective steps are carried out in timed relation with the use of pressured fluid source in association with control valve means.

3. A method for continuously feeding and operatively applying pull-lock blind fasteners each having a shaft with a head at one end and a flanged collar carried by the other end comprising the steps of:

(a) providing a fastener fixing means having a fastener loading groove at the forward end thereof;
(b) continuously feeding fasteners successively into the fastener loading groove of the fastener fixing means;
(c) reciprocally stroking the fastener fixing means;
(d) press fitting the flanged collar portion of the loaded fastener into an aperture during the forward stroke of the fastener fixing means;
(e) pulling up the shaft portion of the fastener during a first portion of the rearward stroke of the fastener fixing means to thereby lock the fastener in that aperture;
(f) severing the shaft at a point rearward of the flange of the fastener collar during a second portion of the rearward stroke of the fastener fixing means;
(g) loading the next succeeding fastener into the fastener loading groove of the fastener fixing means and removing the severed portion of the fastener during a third portion of the rearward stroke of the fastener fixing means.

4. The method of claim 3 including the step of periodically applying a fluid under pressure to effect the reciprocal movement of the fastener fixing means.

* * * * *